UNITED STATES PATENT OFFICE.

FRANZ FUHRMANN, OF BERLIN, GERMANY, ASSIGNOR TO KIRCHHOFF & NEIRATH BERLIN AMERICAN COMMERCIAL COMPANY, OF BERLIN, GERMANY, A FIRM.

PROCESS OF PRODUCING METAL PEROXIDS.

No. 861,826.　　　　Specification of Letters Patent.　　　　Patented July 30, 1907.

Application filed June 14, 1905. Serial No. 265,272. (Specimens.)

To all whom it may concern:

Be it known that I, FRANZ FUHRMANN, Ph. D., a citizen of the Empire of Germany, residing in Berlin, in the Kingdom of Prussia and Empire of Germany, have invented certain new and useful Improvements in Processes of Producing Metal Peroxids, of which the following is a specification.

This invention relates to an improved process of producing high-grade and chemically pure metal-peroxids.

It is well known that the peroxids of the earth-alkali and heavy metals can be readily produced by the action of hydrogen peroxid of a high percentage on the salts of said metals under addition of an alkali, as for instance ammonia. This process possesses the advantage that the peroxids, when produced by the use of the corresponding safety-measures, such as cooling, etc., are obtained mostly as easily filtering, granulous precipitates which are chemically pure and contain a high percentage of hydrogen peroxid. It is further well known that these peroxids can also be obtained by the direct action of sodium peroxid on the corresponding metal-salts. But the products obtained by the latter process are mostly of a viscid, badly filtering character and readily inclined to decomposition. Notwithstanding these characteristics, the sodium peroxid is, owing to its cheapness, better suited for use as a starting material than the hydrogen peroxid of high percentage, which, owing to its high price, is precluded for this purpose.

The present invention consists of a process of making chemically-pure metal peroxids by which all the advantages of hydrogen peroxid are also obtained when sodium peroxid is used as the starting material, and which consists in combining sodium peroxid gradually with a strong inorganic or organic acid, and permitting the so-obtained solution of hydrogen peroxid of a high percentage with a sodium-salt to act on salts of metal in presence of an alkali, as for instance ammonia. The presence of the neutral sodium-salt does not impair the reaction. In place of the metal-salt and ammonia, the corresponding freshly-precipitated hydroxid or oxid of the metal can be used inasmuch as this is obtained primarily from a metal salt and an alkali. In this manner it is easily possible to produce in one operation hydrogen peroxid from sodium peroxid, and by the action of the former on metal-salts the formation of the corresponding peroxid is the final product. The resulting products are fine, granular and easily filtering precipitates, which, owing to their chemical purity, are not inclined to decomposition in the same manner as the viscid products which are obtained by the direct action of sodium peroxid on metal-salts, and which can furthermore be produced by the use of the well known simple filtering and drying appliances. This produces not only a considerable saving in the apparatus required, but also an important technical and economical effect for the reason that in place of the expensive concentrated hydrogen superoxid the cheap sodium peroxid can be used as the starting substance.

The following examples are intended to illustrate the carrying out of the process in practice:

*Example I.* (*For magnesium peroxid*). 30 kg. of hydrochloric acid of 25% are diluted with 15 liters of water and cooled by flowing water. 8 kg. of sodium peroxid are then slowly added to the solution until neutralization of the same takes place. Care has to be taken that the temperature is not raised to too great an extent. After again cooling the solution 22 kg. of a saturated solution of magnesium chlorid is added and then under continuous stirring and cooling 17 kg. ammonia (25%). After the solution has been standing about an hour, the precipitate is filtered off, washed and slowly dried; then again carefully washed and dried.

*Example II.* (*For zinc peroxid*). In place of the magnesium chlorid solution of the first example 13.6 kg. of zinc chlorid (free of water) are dissolved in 10 liters of water and then treated in the same manner as in Example I.

*Example III.* (*For calcium peroxid*). 8 kg. of sodium peroxid are mixed with 30 kg. of hydrochloric acid and 10 liters of water, after which a sufficient quantity of milk of lime corresponding to 7.6 kg. $Ca(OH)_2$ is added, then permitted to stand, then filtered and dried. Or a quantity of concentrated solution of calcium chlorid solution corresponding to 11.1 kg. calcium chlorid ($CaCl_2$) is added, then 17 kg. of ammonia, the resulting solution being then treated as in Example I.

Having thus described my invention, I claim as new and desire to secure by Letters Patent:

1. The process herein described of producing a concentrated easily-filtering and chemically pure metal peroxid from sodium peroxid, which consists in dissolving sodium peroxid in a strong acid, and then causing the hydrogen peroxid so formed to be acted on by a metal hydroxid.

2. The process herein described of producing a concentrated easily-filtering and chemically pure metal peroxid from sodium peroxid, which consists in dissolving sodium peroxid in a strong acid, and then causing the hydrogen peroxid so formed to be acted on by a metal oxid forming metal hydroxid on being introduced into the solution.

3. The process herein described of producing a concentrated easily-filtering and chemically pure metal peroxid from sodium peroxid, which consists in dissolving sodium peroxid in a strong acid, and then causing the hydrogen peroxid so formed to be acted on by a metal salt in presence of an alkali both forming hydroxid on being introduced into the solution.

In testimony, that I claim the foregoing as my invention, I have signed my name in presence of two subscribing witnesses.

FRANZ FUHRMANN.

Witnesses:
  WOLDEMAR HAUPT,
  HENRY HASPER.